United States Patent [19]

Brinkwerth et al.

[11] 4,338,258
[45] Jul. 6, 1982

[54] FLUORESCENT DYESTUFFS, PROCESSES FOR THEIR PREPARATION AND THEIR USE AS LASER DYESTUFFS

[75] Inventors: Wolfgang Brinkwerth, Berg.-Gladbach; Wolfgang Hüffer, Cologne; Roderich Raue, Leverkusen; Rudolf Schieder, Huerth, all of Fed. Rep. of Germany; Helmut Telle, Toronto, Canada

[73] Assignee: Bayer Aktiengesellschaft, Leverkusen, Fed. Rep. of Germany

[21] Appl. No.: 184,695

[22] Filed: Sep. 8, 1980

[30] Foreign Application Priority Data

Sep. 20, 1979 [DE] Fed. Rep. of Germany ....... 2938132

[51] Int. Cl.³ ................. C07C 143/68; C07C 143/40; C07C 143/525; C07C 143/52
[52] U.S. Cl. .......................... 260/456 A; 260/456 P; 260/465 R; 260/465 D; 260/465 E; 260/465 F; 260/265 G; 260/465 K; 260/501.19; 260/501.21; 260/505 C; 260/507 R; 260/508; 260/509; 260/510; 260/512 C; 544/110; 546/347; 560/12; 560/13; 560/14; 8/648; 260/465 H; 372/53
[58] Field of Search ........... 260/456 P, 505 C, 507 R, 260/512 C, 508, 456 A, 509, 510, 465 R, 465 H, 465 D, 465 E, 465 F, 465 G, 465 K, 501.19, 501.21; 560/14, 13, 12; 544/110; 546/347

[56] References Cited

FOREIGN PATENT DOCUMENTS 903577 7/1949 Fed. Rep. of Germany ...... 260/503

OTHER PUBLICATIONS

Meyer et al., Nature, 225, 544 (1970).
Pavlopoulos et al., JACS, 96, 6568 (1974).
Hentrich et al., Chem. Abstract, 48, 6721d (1954) (Abstract of German 903,577).

*Primary Examiner*—Nicky Chan
*Attorney, Agent, or Firm*—Sprung, Horn, Kramer & Woods

[57] ABSTRACT

Fluorescent dyestuffs of the general formula

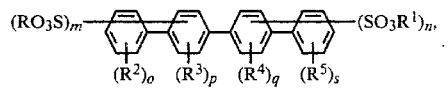

wherein
R and $R^1$ independently of one another represent hydrogen, a salt-forming cation, an alkyl radical with 1 to 16 C atoms or an aryl or aralkyl radical which is optionally substituted by non-chromophoric groups,
$R^2$ to $R^5$ independently of one another represent hydrogen, alkyl, trifluoromethyl, alkoxy, aralkoxy, alkenoxy, aryloxy, halogen or a carboxyl, cyano, alkyl sulphone, aryl sulphone, aralkyl sulphone, carboxamide, sulphonamide or carboxylic acid ester group,
o, p, q and s independently of one another represent 1 or 2 and
m and n independently of one another denote 0, 1 or 2, it being possible for the sum of m and n to be 2 to 4, processes for their preparation and their use as laser dyestuffs.

6 Claims, 5 Drawing Figures

SCHEMATIC BUILD-UP OF THE CONTINUOUS DYESTUFF LASER

FIG. 5.

1 = EXAMPLE 12, IN ETHYLENE GLYCOL
2 = EXAMPLE 12, IN $H_2O$ + N,N-DIPROPYL-ACETAMIDE (10%)

FLUORESCENT DYESTUFFS, PROCESSES FOR THEIR PREPARATION AND THEIR USE AS LASER DYESTUFFS

The invention relates to fluorescent dyestuffs, processes for their preparation and their use as laser dyestuffs.

The new compounds correspond to the formula wherein

R and $R^1$ independently of one another represent hydrogen, a salt-forming cation, an alkyl radical with 1 to 16 C atoms or an aryl or aralkyl radical which is optionally substituted by non-chromophoric groups, $R^2$ to $R^5$ independently of one another represent hydrogen, alkyl, trifluoromethyl, alkoxy, aralkoxy, alkenoxy, aryloxy, halogen or a carboxyl, cyano, alkyl sulphone, aryl sulphone, aralkyl sulphone, carboxamide, sulphonamide or carboxylic acid ester group, o, p, q and s independently of one another represent 1 or 2 and m and n independently of one another denote 0, 1 or 2, it being possible for the sum of m and n to be 2 to 4.

Examples of substituents which may be mentioned are: $C_1$- to $C_{16}$-alkyl radicals, which can be further substituted by hydroxyl, cyano, halogen or phenyl, such as methyl, ethyl, cyanoethyl and tert.-butyl; benzyl; halogen atoms, such as chlorine, bromine or fluorine, preferably chlorine; $C_1$- to $C_5$-alkoxy radicals, such as methoxy, ethoxy, butoxy and isopropoxy; allyloxy; benzyloxy; $C_1$- to $C_5$-alkylsulphonyl radicals, optionally substituted by hydroxyl, such as methylsulphonyl, ethylsulphonyl, n-butylsulphonyl and β-hydroxyethylsulphonyl; the benzylsulphonyl radical; the phenylsulphonyl radical; carboxamide or sulphonamide groups which are optionally mono- or di-substituted by $C_1$- to $C_4$-alkyl radicals; and carboxylic acid $C_1$- to $C_4$-alkyl ester groups.

Possible salt-forming cations are monovalent or divalent metal ions, such as sodium, potassium, lithium, magnesium, calcium, barium, manganese and zinc; and ammonium salts and substitution products thereof which are obtained by reacting the acids on which they are based with mono-, di- or tri-methylamine, mono-, di- or tri-ethylamine, mono-, di- or tri-ethanolamine, methyldiethanolamine, ethyldiethanolamine, dimethylethanolamine, diethylethanolamine, mono-, di- or tri-isopropanolamine, methyldiisopropanolamine, ethyldiisopropanolamine, dimethylisopropanolamine, n-butylamine, sec.-butylamine, dibutylamine, diisobutylamine, triethoxyethanolamine, pyridine, morpholine or piperidine.

Preferred p-tetraphenyl compounds correspond to the formula wherein

Me and Me' represent hydrogen, sodium, potassium, an optionally substituted ammonium radical or an alkyl, aryl or aralkyl group, A, B, C and D independently of one another represent hydrogen, $C_1$- to $C_4$-alkyl, $C_2$- to $C_5$-alkoxyalkyl, $C_1$- to $C_4$-alkoxy, benzyloxy, phenoxy, cyano, halogen, a carboxyl group, a carboxylic acid $C_1$- to $C_8$-alkyl ester group, a carboxamide group which is optionally substituted by $C_1$- to $C_8$-alkyl, a $C_1$- to $C_8$-alkyl sulphone group, an aryl sulphone group or a sulphonic acid amide group which is optionally substituted by alkyl or aryl, m and n denote 0, 1 or 2, the sum of m and n being 2 to 4, and o, p, q and s denote 1 or 2.

A further preferred group of compounds according to the invention corresponds to the formula wherein Me, Me', A and B and the indices m, n, o and p have the same meaning as in formula 1a.

A fourth valuable group of compounds according to the invention corresponds to the formula wherein

A, B, C and the indices m, n, o, p and q have the same meaning as in formula 1a, Me, Me' and Me'' independently of one another have the same meaning as Me and Me' in formula 1a, t represents 0, 1 or 2 and the sum of m, n and t can be 2 to 4.

A further group of compounds according to the invention corresponds to the general formula wherein Me, Me', Me'', A, B, C and D and the indices m, n, o, p, q, s and t have the same meaning as in formula 1a or 1c.

The compounds of the general formula wherein

Me, A and B have the same meaning as in formula 1a, are of particular significance for use as laser dyestuffs.

The p-tetraphenyl compounds according to the invention can be prepared in a manner which is known per se, by reaction of a compound of the formula with a compound of the formula wherein

R to $R^5$ and the indices m, n, o, p, q and s have the same meaning as in formula 1 and X represents halogen, preferably iodine or bromine, under the conditions of an Ullmann reaction (Synthesis 1974, 9) in the presence of copper at temperatures of up to 250° C., either in the melt or in the presence of high-boiling solvents, preferably in dimethylformamide, tetramethylurea, pyridine or quinoline.

Mixtures of p-tetraphenyl compounds of the general formula 1 according to the invention are obtained in this procedure, the compounds being used as laser dyestuffs, either as a mixture, or individually, after separation of the mixture by suitable preparative methods, such as fractional crystallisation or preparative column chromatography.

Symmetric p-tetraphenyls of the general formula 1 can also be prepared by reacting 2 mols of the compounds 2 or 3 under the conditions of an Ullmann reaction.

Compounds of the formula can be reacted with mixtures of compounds of the formulae wherein the radicals R to $R^5$ and the indices m, n, o, p, q and s have the same meaning as in formula 1, X has the meaning given in the case of formula 2 and formula 3, t represents 0, 1 or 2 and the sum of m, n and t can be 2 to 4, in a corresponding manner under the conditions of an Ullmann reaction to give mixtures of p-tetraphenyl compounds of the general formula 1, the compounds being used as laser dyestuffs, either as a mixture, or individually, after suitable preparative separation.

Compounds of the formula 1 according to the invention can also be prepared by reacting one equivalent of compounds of the formula 4 with two equivalents of compounds of the formula 5 or 6 under the conditions of an Ullmann reaction.

Furthermore, the p-tetraphenyl compounds of the formula 1 according to the invention in which R and $R^1$ represent an alkyl radical, with 1 to 16 C atoms, aryl radical or aralkyl radical which is optionally substituted by non-chromophoric groups which are stable towards organometallic reagents can be prepared in a manner which is known per se with the aid of "Ar-Cu/Ar-Hal coupling" and "organometallic oxidative coupling" (Angew. Chem. 91, 1 (1979)), by first producing compounds of the general formula wherein R and $R^1$ have the abovementioned meaning, $R^2$ to $R^5$, the indices m, n, o, p, q and s and the sum of m and n have the same meaning as in formula 1 and Z represents Li or MgX, wherein X has the meaning indicated in formula 2 or 3, in situ from the compounds of the general formulae 2 and 3 by reaction with magnesium or with organometallic lithium compounds in aprotic solvents.

The reactive compounds of the formula 2a and 3a are reacted under the conditions of "organometallic oxidative coupling" in the presence of inorganic salts of the first, second and/or eighth sub-group of the periodic system and/or of thallium (G. Westermann Verlag, 12th Edition, Order No. 12 700) in aprotic solvents at temperatures of −80° C. to 160° C., preferably at −60° C. to 80° C., to give p-tetraphenyl compounds of the general formula 1.

If appropriate mixtures of the reactive intermediate stages 2a and 3a are reacted with one another, mixtures of p-tetraphenyl compounds of the general formula 1 are formed, the compounds being used as laser dyestuffs, either individually, after suitable preparative separation, or as a mixture.

By organometallic compounds of lithium there are to be understood, above all, alkyl-lithium compounds with 1 to 8 C atoms and aryl-lithium compounds which are optionally substituted by alkyl groups. Methyl-, ethyl-, propyl-, butyl-, pentyl-, hexyl- and phenyl-lithium are of particular importance.

By inorganic salts of the first, second and eighth sub-group of the periodic system there are to be understood the halides, preferably the bromides, chlorides and iodides, of copper, zinc, cadmium, mercury, cobalt, nickel and iron, and salts of thallium are also used. Salts which are of particular importance are, above all, $CuCl_2$, $CuBr_2$, $CuI_2$, $ZnCl_2$, $CdCl_2$, $HgCl_2$, $HgCl_2$, $TlBr$, $CoCl_2$, $NiCl_2$, $NiBr_2$, $FeCl_3$ and $FeBr_3$, and $CuCl$, $CuI$ and $CuBr$ if oxygen is simultaneously present.

Examples of suitable aprotic solvents are hydrocarbons, such as pentane, hexane, toluene and xylene, and ethers, such as dialkyl ethers, tetrahydrofurane, dioxane and ethylene glycol dialkyl ethers.

The reactive compounds 2a and 3a are converted under the conditions of "Ar-Cu/Ar-Hal coupling" in situ with the aid of "trans-metallation" into organo-copper compounds by reaction with CuCl, CuI or CuBr, ZCl, ZI or ZBr simultaneously being split off, and the organo-copper compounds are reacted, without intermediate isolation, with the halogen compounds of the general formula 2 or 3 in aprotic solvents at temperatures of $-80°$ C. to $160°$ C., preferably of $-60°$ C. to $80°$ C., to give p-tetraphenyl compounds of the formula 1 according to the invention. If equimolar amounts of the reactive compounds of the general formula 2a are reacted with halogen compounds of the general formula 3 or reactive compounds of the formula 3a are reacted with halogen compounds of the general formula 2, mixtures of the p-tetraphenyl compounds of the general formula 1 are formed, the compounds being used as laser dyestuffs, either individually, after suitable preparative separation, or as a mixture.

The compounds of the formula 4, 5 or 6 can be converted into the reactive compounds of the general formulae $$Z\text{-}\underset{(R^3)_p}{\underset{|}{\bigcirc}}\overset{(SO_3R)_t}{\underset{|}{\bigcirc}}\overset{(SO_3R^1)_t}{\underset{(R^4)_q}{\underset{|}{\bigcirc}}}\text{-}Z \qquad \underset{(R^2)_o}{\underset{|}{\bigcirc}}\overset{(SO_3R)_m}{\underset{|}{\bigcirc}}\text{-}Z \quad \text{or} \quad \underset{(R^5)_s}{\underset{|}{\bigcirc}}\overset{(SO_3R^1)_n}{\underset{|}{\bigcirc}}\text{-}Z$$

4a  5a  6a wherein
R and $R^1$ represent an alkyl radical, with 1 to 16 C atoms, aryl radical or aralkyl radical which is optionally substituted by non-chromophoric groups which are stable towards organometallic reagents,
$R^2$ to $R^5$ and the indices m, n, o, p, q and s have the same meaning as in formula 1,
t represents 0, 1 or 2,
the sum of m, n and t can be 2 to 4 and
Z represents Li or MgX,
wherein
X has the same meaning as in formula 4, 5 and 6, in situ in a corresponding manner by reaction with magnesium or with organometallic compounds of lithium in aprotic solvents. These products are reacted under the conditions of "Ar-Cu/Ar-Hal coupling" in situ with CuCl, CuI or CuBr, ZCl, ZI or ZBr simultaneously being split off, to give the corresponding organo-copper compounds, which are reacted with the corresponding halogen compounds 4, 5 or 6 in the manner described.

If compounds of the general formula 4a are reacted with equimolar mixtures of the halogen compounds 5 and 6 or equimolar mixtures of the reactive compounds of the general formula 5a and 6a are reacted with halogen compounds of the formula 4, mixtures of the p-tetraphenyl compounds according to the invention are formed, the compounds being used as laser dyestuffs, individually, after suitable separation, or as a mixture.

Furthermore, mixtures of compounds of the general formula 1 according to the invention in which R and $R^1$ represent hydrogen or a salt-forming cation can also be prepared by reacting compounds of the general formula $$(RO_3S)_m\text{-}\underset{(R^2)_o}{\underset{|}{\bigcirc}}\text{-}\underset{(R^3)_p}{\underset{|}{\bigcirc}}\text{-}X \qquad 2b$$

with compounds of the general formula $$(R^1O_3S)_n\text{-}\underset{(R^5)_q}{\underset{|}{\bigcirc}}\text{-}\underset{(R^4)_s}{\underset{|}{\bigcirc}}\text{-}X \qquad 3b$$

wherein
R and $R^1$ have the abovementioned meaning,
$R^2$ to $R^5$ and the indices m, n, o, p, q and s have the same meaning as in formula 1 and
X represents halogen, preferably bromine or iodine,
with the aid of "palladium-catalysed coupling" in aqueous, strongly alkaline solution in the presence of a formic acid salt, a hydrogenation catalyst and a surface-active agent of the general formula $$\left[ R^9\text{-}\underset{R^8}{\overset{R^6}{\underset{|}{N}}}\text{-}R^7 \right]^+ Y^- \qquad 7$$

wherein
at least one of the radicals $R^6$ to $R^9$ denotes an optionally substituted hydroxyalkyl or alkoxy-alkyl group with 1 to 16 C atoms and the remaining radicals denote optionally substituted alkyl groups and
$Y^-$ represents one of the ions F, Cl, Br, OH, $SO_4$ or $HSO_4$.

Symmetric p-tetraphenyls of the general formula 1 can also be prepared by reacting 2 mols of the compounds 2b or 3b with the aid of "palladium-catalysed coupling".

The preparation, according to the invention, of the p-tetraphenyl compounds with the aid of "palladium-catalysed coupling" must be regarded as surprising since, according to the teachings of German Offenlegungsschrift 2,540,740, only aromatic compounds which are insoluble or slightly soluble in water can be reacted under comparable conditions.

Choline bases prepared from trialkylamines and ethylene oxide or propylene oxide are of particular importance as surface-active agents of the general formula 7.

The formic acid salts employed are preferably the alkali metal salts, either in solid form or as an aqueous solution, in a molar proportion of 0.5 to 3 equivalents, preferably one equivalent.

The pH value of the solution can be established with an alkali metal hydroxide or carbonate, for example with sodium hydroxide. The coupling is particularly favoured by strongly alkaline conditions.

Palladium catalysts, above all palladium-on-wood charcoal or palladium-on-CaCO₃, are outstandingly suitable hydrogenation catalysts.

The reaction is carried out in an inert atmosphere, such as, for example, nitrogen, and reflux conditions are expedient, but the reaction can also be carried out at temperatures up to 150° C. and under pressure.

Furthermore, the compounds of the general formula 1 according to the invention can be prepared in a manner which is known per se from compounds of the general formula

8 wherein
R² to R⁵ and the indices o, p, q and s have the same meaning as in formula 1,
in accordance with the method of Meerwein (Chem. Ber. 90, 849 (1957)), by tetrazotisation and reaction of the tetrazotisation product with sulphur dioxide under heavy metal catalysis. The p-tetraphenyl-disulphonic acid chlorides formed can be converted into compounds of the formula 1 according to the invention with the aid of known reactions.

The compounds of the formula 8 can be prepared in a manner which is known per se (J. Chem. Soc., Chem. Com. 1969, 1235; and U.S. Pat. No. 4,079,082), from the corresponding tetraphenyl compounds by nitration and subsequent reduction.

Furthermore, the p-tetraphenyl compounds of the formula 1 according to the invention can be prepared by after-sulphonation of p-tetraphenyl compounds of the general formula

9 wherein
R² to R⁵ and the indices o, p, q and s have the meaning given in the case of formula 1,
in a manner which is known per se with concentrated sulphuric acid and oleum under an inert gas atmosphere, for example under nitrogen, at temperatures of 0° to 60° C., preferably of 20° to 40° C.

The halogen compounds of the formulae 2, 3, 4, 5 and 6 can be prepared in a manner which is known per se by bromination, iodination or chlorination of the halogen-free compounds, by replacement of amino groups by bromine, iodine or chlorine with the aid of a Sandmeyer reaction, or by after-sulphonation of the corresponding halogen compounds.

Examples of suitable halogen compounds of the formulae 2, 3, 4, 5 and 6 are the compounds listed below and the sulphonic acid derivatives which are derived therefrom and can be prepared by simple reactions:

-continued

-continued

-continued

Solutions of compounds of the formula 1 are suitable for producing coherent variable-frequency monochromatic radiation (laser light) by means of a dyestuff laser, which consists of a reservoir for the dyestuff solution and, connected thereto, an energy source which is capable of stimulating the dyestuff solution to produce an emission, the radiation produced being in the wavelength range from 360 to 430 nm.

A laser is a light amplification device, with the aid of which it is possible to produce coherent monochromatic light of a high spectral and geometric intensity density. The laser consists of an optical resonator, which contains the liquid laser-active material in a thin-walled quartz cell. The cell usually forms part of a closed system through which the dyestuff solution is pumped in circulation whilst the laser is functioning. The active medium can also be in the form of a stream of liquid which issues, from a nozzle, at right angles to the optical axis and traverses the resonator. Local overheating, which would lead to optical inhomogeneities, is avoided in both arrangements.

The dyestuffs are stimulated with the aid of energy sources by means of electrons or light, it also being possible for the dyestuff laser to be stimulated by a gas laser, for example a nitrogen laser, argon laser or crypton laser. Excimer lasers, for example the xenon chloride laser or crypton fluoride laser, are also particularly suitable energy sources.

The stimulation, which is also called optical pumping, causes the electrons of the molecule of the laser dyestuff to be raised from their normal state to a high energy state, from which radiation transition takes place. If the number of molecules in the excited state exceeds that of the molecules in the lower states, stimulated transitions, by means of which the light in the optical resonator is amplified, result.

If one of the laser mirrors is partially transparent to light, some of the radiation leaves the apparatus in the form of a laser beam. In cases of very effective stimulation, dyestuffs which are particularly easy to stimulate exhibit the phenomenon of super-radiance. This can be observed, for example, when a quartz cell containing a solution of such a dyestuff is placed in a beam of a nitrogen laser. The solution then emits light in a preferred direction, similarly to the case of a laser, without being located between resonator mirrors.

Compared with the solid laser or gas laser, a considerable advantage of the dyestuff laser is its ability to supply variable frequency laser radiation. Because of the width of the fluorescence band of the dyestuffs employed, dyestuff lasers can be tuned, by inserting a frequency-selective element, for example a reflection grating, prism or birefringent refracting filter, so that laser light is emitted at any desired wavelength within the entire fluorescence band of the dyestuff.

Although a large number of suitable dyestuffs has already been proposed, there is still a considerable lack of compounds, especially for the near UV region, which give a very high degree of effectiveness of the laser. Moreover, it has not hitherto been possible to produce continuous laser radiation below 390 nm. When used in the dyestuff laser, the compounds according to the invention are distinguished by an exceptionally high stability to light.

Laser light of variable frequency lasers has in recent years achieved considerable importance in spectroscopy. The lasers can be employed for analytical purposes, high resolution spectroscopy, fluorescence spectroscopy, absorption spectroscopy, lifetime measurement and photoionisation and in the spectroscopy of negative ions. They are furthermore of great industrial significance in information technology, environmental protection and separation of isotopes.

EXAMPLE 1

65 ml of a 20% strength solution of n-butyl-lithium in n-hexane are added dropwise to a suspension of 36.9 g of 4,4′-bromobiphenylsulphonic acid butyl ester, 150 ml of tetrahydrofurane and 150 ml of ether at −60° to −70° C. in the course of 30 minutes and the mixture is then stirred for 15 minutes. 40 g of copper-II chloride are then added in portions and the reaction mixture is brought slowly to room temperature and stirred for 10 hours. Hydrolysis is carried out with 150 ml of 5% strength HCl solution and the mixture is stirred until the copper salts have completely dissolved. The colourless precipitate formed in the reaction is filtered off and recrystallised from toluene, active charcoal being added. 6 g of 4,4‴-tetraphenyldisulphonic acid butyl ester with a decomposition point of 260° C. and an absorption and fluorescence maximum of 310 nm and 385 nm (dimethylformamide) respectively are obtained.

Analysis: calculated: C 66.41, H 5.92, S 11.08. found: C 65.9; H 5.8; S 11.3.

The 4,4′-bromobiphenylsulphonic acid butyl ester used as the starting material is obtained in the following manner.

82 g of 4,4′-bromobiphenylsulphonic acid-prepared from 4-bromobiphenyl and chlorosulphonic acid in accordance with statements in the literature (J. Org. Chem. 26, 195 (1961))-are heated in 650 ml of chlorobenzene to 80°–90° C., and, after adding catalytic amounts of dimethylformamide, 100 ml of thionyl chloride are added dropwise. After a reaction for 12 hours at 80°–90° C., excess thionyl chloride is largely distilled off together with the chlorobenzene and the precipitate which has separated out is isolated. After recrystallisation from methylcyclohexane, 4,4′-bromobiphenylsulphonic acid chloride is obtained in 85–90% yield and with a melting point of 127°–128° C.

4,4′-Bromobiphenylsulphonic acid butyl ester is obtained from the acid chloride as follows.

22 g of pyridine are added dropwise to a solution of 54 g of 4,4′-bromobiphenylsulphonic acid chloride, 250 ml of chloroform and 11 g of butanol such that the temperature can be kept at 0° C. After a reaction time of 2 hours, the slightly turbid solution is filtered, 150 ml of 10% strength hydrochloric acid are added to the filtrate and the organic phase is separated off and concentrated to dryness. 4,4'-Bromobiphenylsulphonic acid butyl ester, which is formed in 80% yield and has a melting point of 48°–49° C., can be employed further without purification.

Further 4,4'''-tetraphenyldisulphonic acid esters, of which the methyl, ethyl, propyl, hexyl, phenyl and o- and p-tolyl esters may be singled out in particular, can be prepared in an analogous manner.

Using the halogenobiphenyl compounds listed in Table 1, the corresponding p-tetraphenyl compounds can also be prepared under the conditions of Example 1:

EXAMPLE 11

4 g of 4,4'''-tetraphenyldisulphonic acid butyl ester are heated to the boiling point with 40 ml of 30% strength sodium alcoholate solution in 100 ml of alcohol or with 30 ml of dilute sodium hydroxide solution with the addition of 50 ml of methyl glycol for several hours. After cooling the solution, the disodium salt of 4,4'''-tetraphenyldisulphonic acid precipitates as colourless crystals, which are filtered off and washed with a little water.

The absorption and fluorescence maximum of the compound are 308 nm and 379 nm (dimethylformamide/$H_2O$ 1/1) respectively.

EXAMPLE 12

TABLE 1

| No. | Starting compounds | Tetraphenyls |
|---|---|---|
| 2 | $C_3H_7O_3S$–⌬–⌬–I, with $CH_3$ | $C_3H_7O_3S$–⌬–⌬–⌬–⌬–$SO_3C_3H_7$, with $CH_3$, $CH_3$ |
| 3 | $C_2H_5O_3S$–⌬–⌬–Br, with $CH_3$ | $C_2H_5O_3S$–⌬–⌬–⌬–⌬–$SO_3C_2H_5$, with $CH_3$, $CH_3$ |
| 4 | $CH_3$–⌬–⌬–Br, with $SO_3C_4H_9$ | $CH_3$–⌬–⌬–⌬–⌬–$CH_3$, with $SO_3C_4H_9$, $SO_3C_4H_9$ |
| 5 | NC–⌬–⌬–I, with $SO_3C_2H_5$ | NC–⌬–⌬–⌬–⌬–CN, with $SO_3C_2H_5$, $SO_3C_2H_5$ |
| 6 | $C_3H_7O_3S$–⌬–⌬–Br, with Cl | $C_3H_7O_3S$–⌬–⌬–⌬–⌬–$SO_3C_3H_7$, with Cl, Cl |
| 7 | $C_6H_5O_3S$–⌬–⌬–Br, with $CH_3$ | $C_6H_5O_3S$–⌬–⌬–⌬–⌬–$SO_3C_6H_5$, with $CH_3$, $CH_3$ |
| 8 | $C_2H_5O_3S$–⌬–⌬–Br, with $COOC_2H_5$ | $C_2H_5O_3S$–⌬–⌬–⌬–⌬–$SO_3C_2H_5$, with $COOC_2H_5$, $COOC_2H_5$ |
| 9 | ⌬–⌬–I, with $SO_3C_4H_9$ | ⌬–⌬–⌬–⌬, with $SO_3C_4H_9$, $SO_3C_4H_9$ |
| 10 | $C_3H_7O_3S$–⌬–⌬–Br, with $SO_3C_3H_7$ | $C_3H_7O_3S$–⌬–⌬–⌬–⌬–$SO_3C_3H_7$, with $SO_3C_3H_7$, $SO_3C_3H_7$ |

The p-tetraphenylsulphonic acids can be prepared from the sulphonic acid esters, preferably the aliphatic esters, by alkaline hydrolysis:

0.7 g of palladium-on-active charcoal (5% strength) is added, as a catalyst, at 100° C. to a clear solution of 15.6 g of 4,4'-bromobiphenylsulphonic acid, 200 ml of water and 2 g of choline base, as a surface-active agent, prepared from triethylamine and ethylene oxide. A mixture of 3.5 g of sodium formate, 32 g of 32% strength NaOH and 100 ml of water is then added dropwise. The reaction mixture is heated under reflux for 18 hours, diluted with 500 ml of water and, after heating for a short time, filtered hot. 2 g of the sodium salt of 4-biphenylsulphonic acid, formed by reductive dehalogenation, are isolated from the mother liquor, whilst the disodium salt of 4,4'''-tetraphenyldisulphonic acid can be obtained in 30% yield with an active compound content of 97%, by hot extraction of the residue with a solvent mixture of water/dimethylformamide (1/1). In dimethylformamide/water (1/1), the compound has an absorption maximum of 310 nm and a fluorescence maximum of 379 nm.

The halogenobiphenl compounds listed in Table 2 can be reacted analogously to prepare the corresponding p-tetraphenyl compounds:

EXAMPLE 17

A mixture of 10.1 g of 4,4'-diiodobiphenyl and 18.0 g of 4-iodo-benzenesulphonic acid phenyl ester is heated to 180°–190° C. in a metal bath, and 20 g of copper bronze are added in portions such that the temperature does not rise above 210° C. The reaction which proceeds is highly exothermic. It can be accelerated by adding a few grains of iodine or small amounts of copper-II salts. After cooling, the melt cake is comminuted and continuously extracted hot with dimethylformamide. 2.3 g of 4,4'''-tetraphenyldisulphonic acid phenyl ester can be isolated from the dimethylformamide solution with an absorption and fluorescence maximum of 322 nm and 390 nm respectively. The compound is insoluble in most organic solvents.

The p-iodobenzenesulphonic acid phenyl ester required as the starting compound can be prepared by a process analogous to that described in J. Chem. Soc. 1956, 1667 for the preparation of the corresponding o-iodobenzenesulphonic acid phenyl ester by converting the acid into the sulphochloride and then esterifying the sulphochloride with phenol in the presence of an excess of sodium carbonate by heating on a water bath.

The p-tetraphenyl compoudns summarised in Table 3 can be prepared in a corresponding manner:

TABLE 2

| No. | Halogenobiphenyls | p-Tetraphenyls |
|---|---|---|
| 13 | HO₃S—⌬—⌬—Br, Cl | NaO₃S—⌬—⌬(Cl)—⌬(Cl)—⌬—SO₃Na |
| 14 | HO₃S—⌬—⌬—Br, CH₃ | NaO₃S—⌬—⌬(CH₃)—⌬(CH₃)—⌬—SO₃Na |
| 14a | HO₃S—⌬—⌬—I, CH₃ | NaO₃S—⌬—⌬(CH₃)—⌬(CH₃)—⌬—SO₃Na |
| 15 | HO₃S—⌬—⌬—Br, COOH | NaO₃S—⌬—⌬(COONa)—⌬(COONa)—⌬—SO₃Na |
| 16 | ⌬—⌬(SO₃H)—Br | ⌬—⌬(SO₃Na)—⌬(SO₃Na)—⌬ |

TABLE 3

| No. | Starting compounds | | p-Tetraphenyls |
|---|---|---|---|
| 18 | C₄H₉O₃S—⌬—I | I—⌬(OCH₃)—⌬(OCH₃)—I | C₄H₉O₃S—⌬—⌬(OCH₃)—⌬(OCH₃)—⌬—SO₃C₄H₉ |
| 19 | " | Br—⌬—(SO₂)—⌬—Br | C₄H₉O₃S—⌬—⌬—(SO₂)—⌬—⌬—SO₃C₄H₉ |

TABLE 3-continued

| No. | Starting compounds | p-Tetraphenyls |
|---|---|---|
| 20 | CH₃—⟨⟩—I  I—⟨⟩—⟨⟩(SO₃C₄H₉)(SO₃C₄H₉)—I | CH₃—⟨⟩—⟨⟩—⟨⟩(SO₃C₄H₉)(SO₃C₄H₉)—⟨⟩—CH₃ |
| 21 | C₆H₅O₃S—⟨⟩—I  Br—⟨⟩—⟨⟩(SO₃C₆H₅)—Br | C₆H₅O₃S—⟨⟩—⟨⟩—⟨⟩(SO₃C₆H₅)—⟨⟩—SO₃C₆H₅ |
| 22 | CH₃O—⟨⟩—I  I—⟨⟩(SO₃C₄H₉)—⟨⟩(SO₃C₄H₉)—I | CH₃O—⟨⟩—⟨⟩(SO₃C₄H₉)—⟨⟩(SO₃C₄H₉)—⟨⟩—OCH₃ |
| 23 | C₄H₉O₃S—⟨⟩(OCH₃)—I  I—⟨⟩—⟨⟩—I | C₄H₉O₃S—⟨⟩(OCH₃)—⟨⟩—⟨⟩—⟨⟩(OCH₃)—SO₃C₄H₉ |

EXAMPLE 24

6.1 g of p-tetraphenyl are stirred in a mixture of 60 ml of concentrated sulphuric acid and 40 ml of 20% strength oleum at 20°–25° C. until the p-tetraphenyl has almost completely dissolved. The reaction mixture is discharged onto 500 ml of an ice/water mixture, the insoluble residue is filtered off and the reaction mixture is then neutralised with CaCO₃. After filtering off the CaSO₄ formed, the mixture is concentrated to dryness and the residue is recrystallised from dimethylformamide with the addition of Tonsil. 3.5 g of the p-tetraphenyl of the formula with an absorption maximum of 322 nm and a fluorescence maximum of 412 nm (in ethylene glycol) are isolated.

EXAMPLE 25

Figure 1:
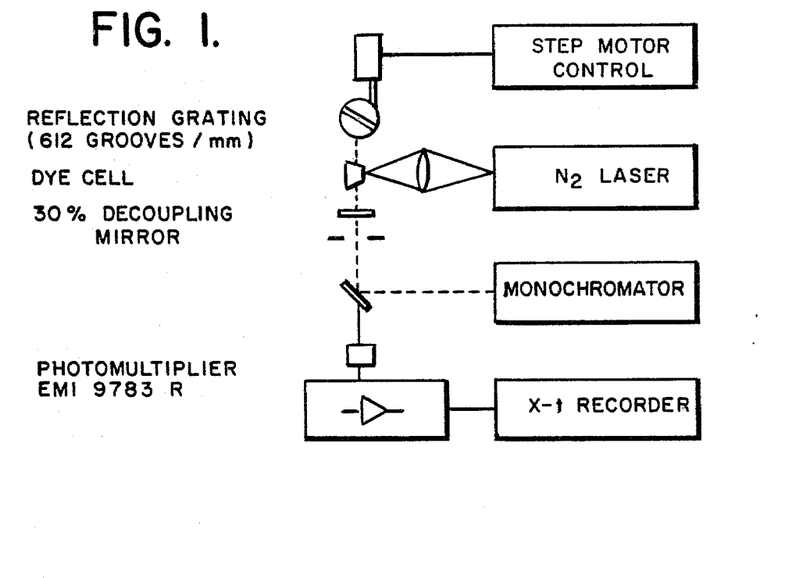

The compound prepared according to the statements of Example 1 was dissolved, in a concentration of $1.3 \times 10^{-3}$ mols/l, in a mixture of 50% of methanol and 50% of ethylene glycol. This solution was pumped from a reservoir through the dyestuff cell in an apparatus according to FIG. 1. The frequency of the wavelength was varied by a reflection grating with a step motor drive. The laser spectrum was recovered via a photomultiplier, which was spectrally calibrated, and the wavelength was calibrated by a monochromator. In order to measure the power, the photomultiplier was replaced by a thermopile measuring head with an ancillary measuring amplifier. The nitrogen laser used had a wavelength of 337 nm, a pulse frequency of 100 Hz, a pulse width of 7 nseconds and a pulse peak power of 100 kW.

Figures 2, 2A, 2B:
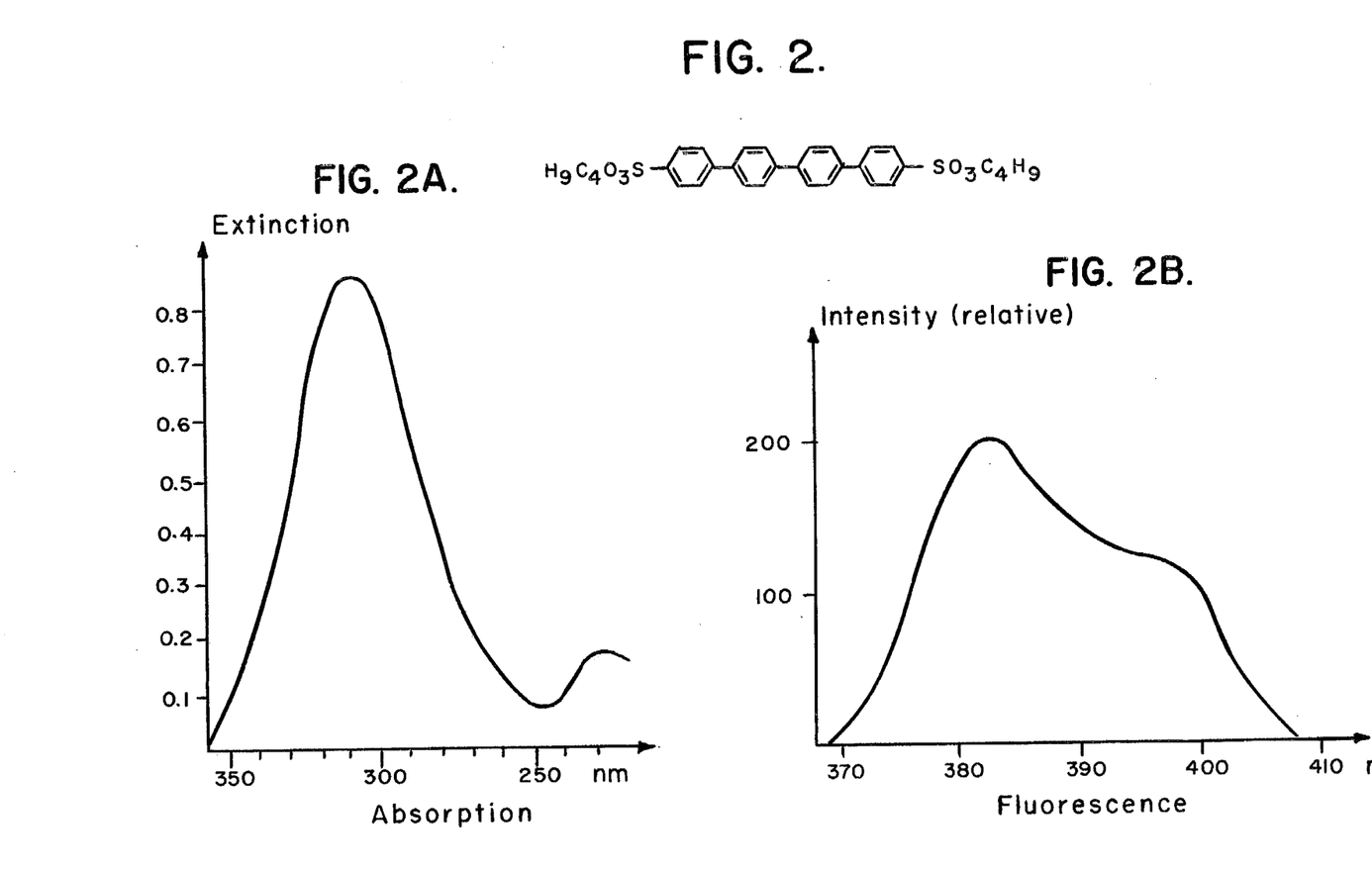

The absorption spectrum of the dyestuff and the dependence of the laser power on the wavelength are shown in FIG. 2

EXAMPLE 26

Figure 3:
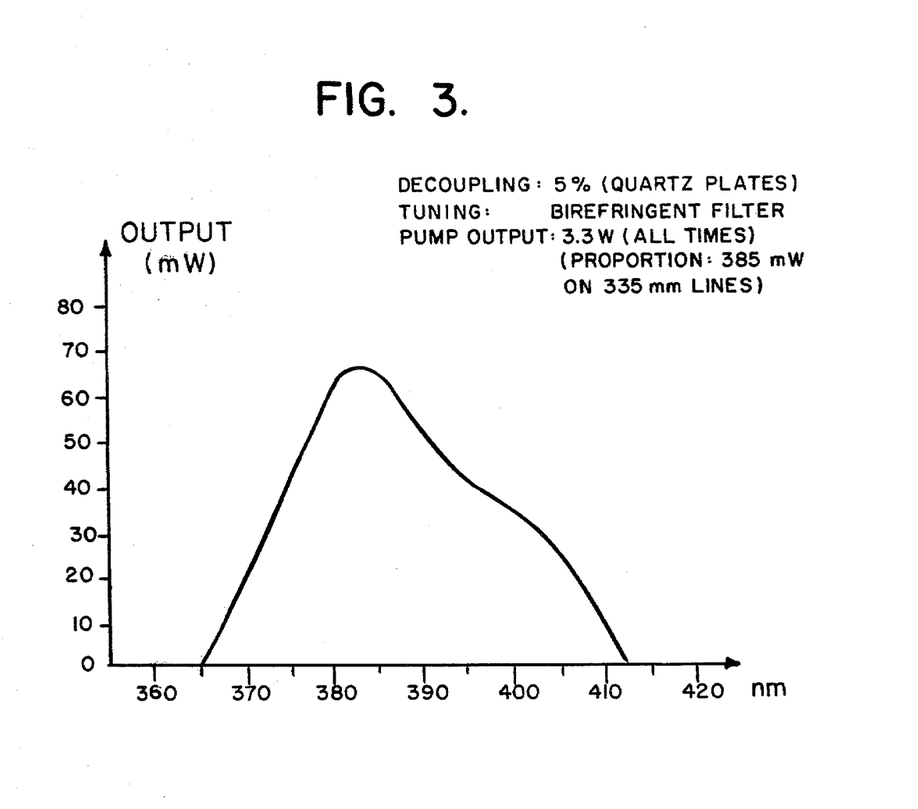
Figure 4:
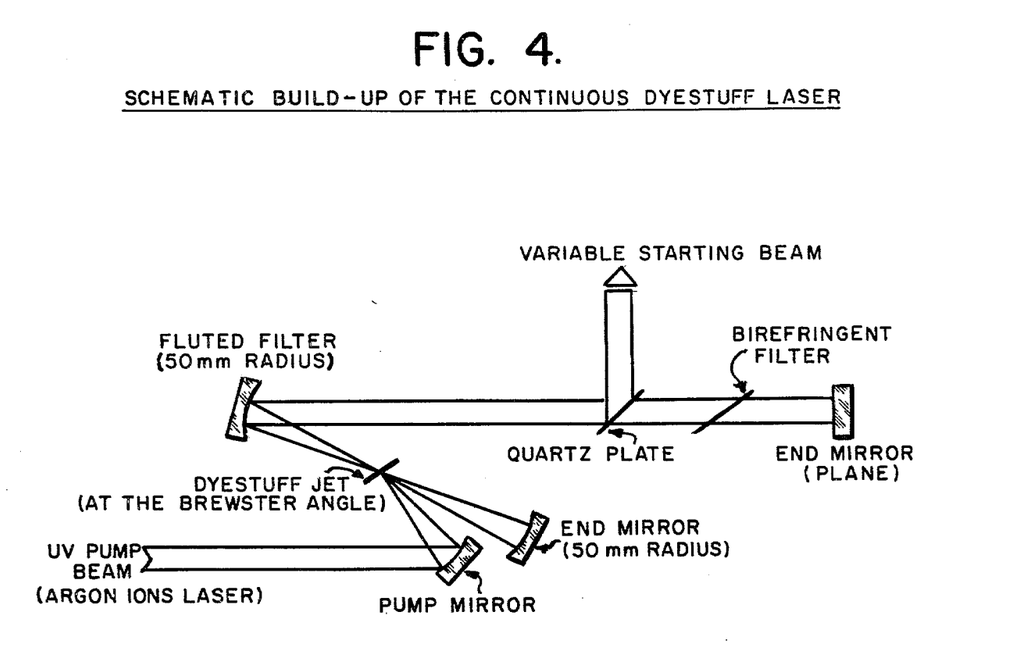

The compound prepared according to the statements of Example 1 was dissolved, in a concentration of $2.5 \times 10^{-3}$ mol/l, in ethylene glycol and was stimulated to continuous radiation by an argon ion laser. The tuned region extends from 365 to 411 nm and is shown in the FIG. 3. The build-up of the dyestuff laser can be seen from FIG. 4.

EXAMPLE 27

Figure 5:
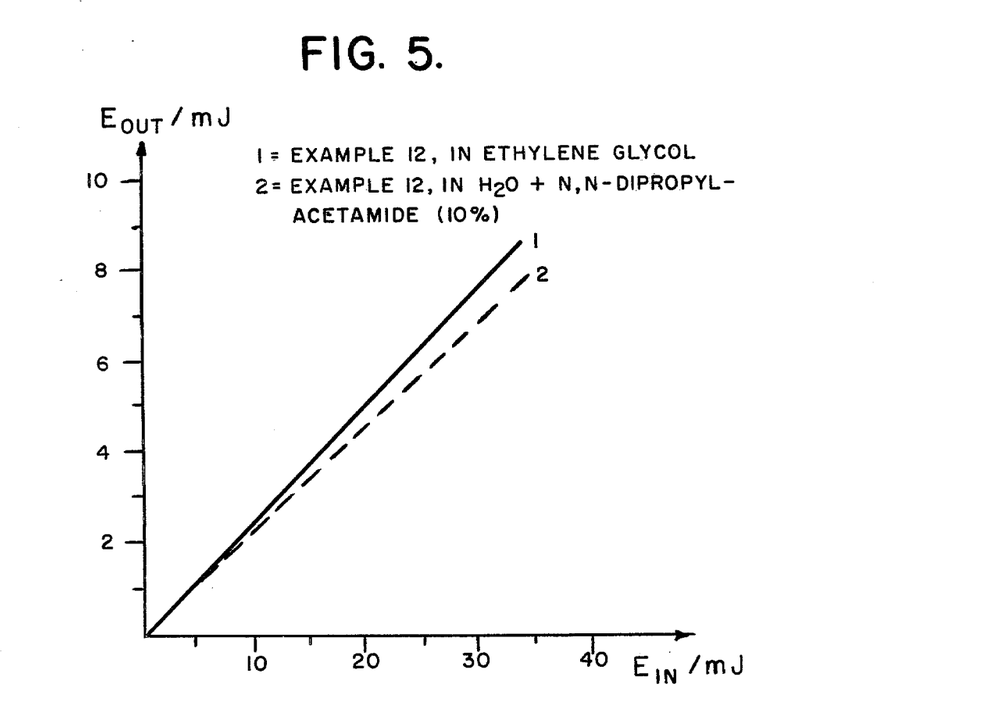

The compound prepared according to the statements of Example 12 was dissolved, in a concentration of $2 \times 10^{-4}$ mol/l, in ethylene glycol. A xenon chloride excimer laser was employed for stimulation. Without frequency-selective elements, the wavelength of the dyestuff laser was 381 nm. FIG. 5 shows the output power of the dyestuff laser as a function of the incident stimulation energy. The laser power curve shows a mean energy conversion of 26%. If the dyestuff prepared according to the statements of Example 12 is dissolved, in a concentration of $2 \times 10^{-4}$ mol/l, in a 10% strength solution of N,N-dipropylacetamide in water, a dyestuff laser emission at 378 nm results without frequency-selecting elements. FIG. 5 again shows the output power as a function of the incident energy. The laser power curve indicates an energy conversion of 23%.

We claim:

1. Fluorescent dyestuffs of the general formula wherein

R and R¹ independently of one another represent hydrogen, a salt-forming cation, an alkyl radical with 1 to 16 C atoms or an aryl or aralkyl radical which is optionally substituted by non-chromophoric groups, R² to R⁵ independnetly of one another represent hydrogen, alkyl, trifluoromethyl, alkoxy, aralkoxy, alkenoxy, aryloxy, halogen or a carboxyl, cyano, alkyl sulphone, aryl sulphone, aralkyl sulphone, carboxamide, sulphonamide or carboxylic acid ester group, o, p, q and s independently of one another represent 1 or 2 and m and n independently of one another denote 0, 1 or 2, the sum of m and n being 2 to 4.

2. Fluorescent dyestuffs of the general formula wherein
- Me and Me' represent hydrogen, sodium, potassium, an optionally substituted ammonium radical or an alkyl, aryl or aralkyl group,
- A, B, C and D independently of one another represent hydrogen, $C_1$- to $C_4$-alkyl, $C_2$- to $C_5$-alkoxyalkyl, $C_1$- to $C_4$-alkoxy, benzyloxy, phenoxy, cyano, halogen, a carboxyl group, a carboxylic acid $C_1$- to $C_8$-alkyl ester group, a carboxamide group which is optionally substituted by $C_1$- to $C_8$-alkyl, a $C_1$- to $C_8$-alkyl sulphone group, an aryl sulphone group or a sulphonic acid amide group which is optionally substituted by alkyl or aryl,
- m and n denote 0, 1 or 2, the sum of m and n being 2 to 4, and
- o, p, q and s denote 1 or 2.

3. Fluorescent dyestuffs of the general formula wherein
  Me, Me', A and B and the indices m, n, o and p have the meaning given in claim 2.

4. Fluorescent dyestuffs of the general formula wherein
- A, B, C and the indices m, n, o, p and q have the same meaning as in claim 2,
- Me, Me' and Me" independently of one another have the meaning given in claim 2 for Me and Me',
- t represents 0, 1 or 2 and
- the sum of m, n and t being 2 to 4.

5. Fluorescent dyestuffs of the general formula wherein
  Me, Me', Me", A, B, C and D and the indices m, n, o, p, q, s and t have the meaning given in claim 2 or 4.

6. Fluorescent dyestuffs of the general formula wherein
  Me, A and B have the same meaning as in claim 2.

* * * * *